June 2, 1970  E. G. D. RODRIGUES  3,514,839

METHOD FOR MAKING MULTIWALL VESSELS

Filed Aug. 2, 1967

INVENTOR
EDOUARD GEORGES DANIEL RODRIGUES
BY
Kenyon & Kenyon
ATTORNEYS

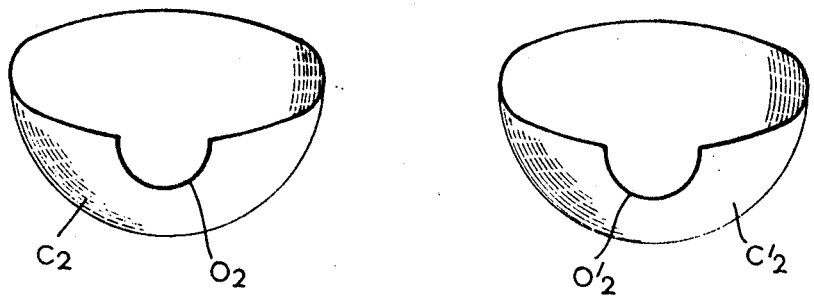
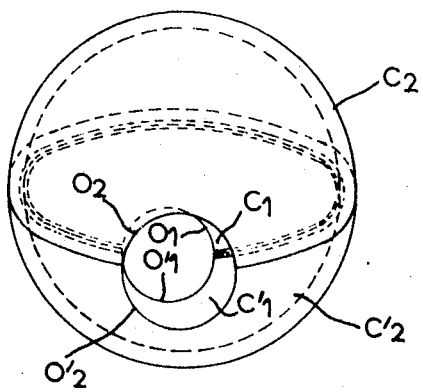
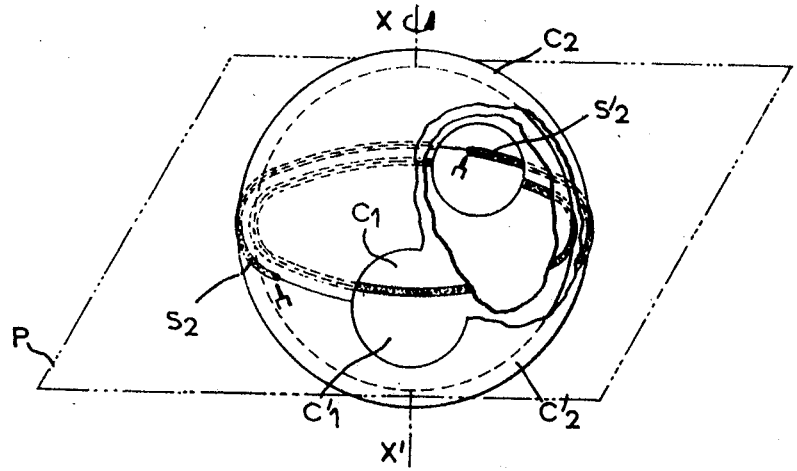

June 2, 1970  E. G. D. RODRIGUES  3,514,839
METHOD FOR MAKING MULTIWALL VESSELS
Filed Aug. 2, 1967  3 Sheets-Sheet 3

INVENTOR
EDOUARD GEORGES DANIEL RODRIGUES
BY Kenyon & Kenyon
ATTORNEYS

3,514,839
METHOD FOR MAKING MULTIWALL VESSELS
Edouard Georges Daniel Rodrigues, La Ciotat, France,
  assignor to Chantiers Navals de la Ciotat, La Ciotat,
  Bouches-du-Rhone, France, a company of France
Filed Aug. 2, 1967, Ser. No. 657,761
Claims priority, application France, Aug. 26, 1966,
74,375
Int. Cl. B21d 39/02
U.S. Cl. 29—463                                   2 Claims

ABSTRACT OF THE DISCLOSURE

The method for making vessels, designed to contain any product exerting upon its walls a high pressure, and having a wall thickness which is function of said pressure value and of the material the vessel is made of, consists in imbricating into each other $n$ homothetic and coaxial sheaths of revolution, each having a thickness value $e/n$ sufficiently low to allow a complete penetration welding, each of these sheaths being itself composed by at least two identical shells assembled by welding, and in providing, between said sheaths, connecting means.

---

The persent invention has essentially for its object a method for making multiwall vessels or the like, especially pressure vessels designed to contain any product exerting upon its walls a very high pressure, for example a liquefied gas, and presenting a wall thickness $e$ function of said pressure value and of the material said walls are made of.

It is known that if the construction of vessels or the like with wall thicknesses of about 40 to 50 mm. is of a usual practice and presents no technical difficulties, the construction of vessels with wall thicknesses of beyond 50 mm. creates on the contrary embarrassing problems, which are mainly due to the difficulties met in performing a proper welding of the walls. If, from a purely technical point of view, it remains nevertheless possible to weld together walls reaching a thickness of up to 150 mm., it is still obvious that the multiplicity of the difficulties met increase considerably the costs and that, for economical reasons, the constructions requiring such weldings are generally avoided.

But the storage in large quantities of gas, especially when under high pressure, leads to contemplate the construction of vessels with walls reaching a thickness of 200 mm. and more.

The present invention aims at a method for making vessels of the aforementioned type, allowing to obtain very thick walls while still avoiding the hereabove listed drawbacks. The method is remarkable notably in that it consists to imbricate into each other $n$ homothetic and coaxially disposed sheaths of revolution, with a wall thickness value of about $e/n$, the thickness of each sheath being sufficiently small to allow the performance of a complete penetration welding, each of said sheaths being itself composed of at least two identical shells assembled through welding, and in providing, between said walls, connecting means, in such a way as to obtain a multilayer vessel wall.

It will be readily appreciated that the method according to the invention allows, by substituting the machining of several relatively thin sheaths to the fabrication of a single sheath with an important thickness, to resolve thus the welding problems which, up to now, practically prohibited the construction of very large containers.

According to another feature of the invention, the vessels are constructed by machining first a set of pairs of homothetic hollow shell portions, two matching shell portions having identical dimensions and being juxtaposable along a common junction line which is located substantially in a plane perpendicular to their axis of revolution, each shell portion being provided with an orifice opening upon their border of junction and sufficiently large to give passage to a man, and by juxtaposing the two smallest shell portions along their junction line, the orifices being in front of each other, so as to constitute a closed container provided with a man-hole, then by welding together, internally and externally, said shell portions along said junction line. then by covering this container with the two next larger shell portions so as to constitute a second container in circumscribing relation with the first, these two shell portions being welded together externally and internally by revolving the internal container, then by rendering the two imbricated containers solid in rotation with each other, their man-holes being coincident, and by repeating this process until the utmost container is achieved.

It will be appreciated that this method allows constituting sheaths which may have any configuration, the only condition to be met by these sheaths being to admit of an axis of revolution. The range of application of the method is hence extremely wide as an innumerable quantity of revolving forms may be imagined.

According to another feature of the invention, a filling substance is introduced within the space comprised between two neighbouring sheaths, in order to allow the transmission of the internal pressure from a sheath to the next and to secure eventually a support for the internal sheath.

A resilient support of this kind allows to admit fairly large construction clearances, and consequently to obtain a relatively reduced cost price.

Moreover, it should be noted that the construction according to the method of the invention is especially simple, as the achieved vessel is constituted by several sheaths, each of which is a standard container.

The possibility of achieving without any welding difficulties multilayer container walls with a very important total thickness, allows to contemplate the construction of very large vessels, submitted to considerable internal pressures.

Finally, it is obvious that a multilayer wall is much safer than an ordinary wall, as, in case of a leakage in one of the containers, the fluid-tightness is secured by the remaining sheaths.

The invention covers also, as new industrial products, the vessels or the like constructed according to the aforementioned process.

The present invention will now be described in greater detail by way of examples with reference to the accompanying drawings, wherein:

FIG. 4 is a perspective view showing a second pair of hemispheres each provided with a semi-circular recess, the hemisphere constituting the second container surrounding the first one;

FIG. 5 is a perspective view showing the hemispheres of FIG. 4 positioned to form a second container surrounding the first container;

FIG. 6 is a perspective view identical to FIG. 5 and showing the manner in which the hemispheres of the second pair are welded together to constitute the second container, the containers being partly broken away so that the internal welding may be seen;

Figure 1:
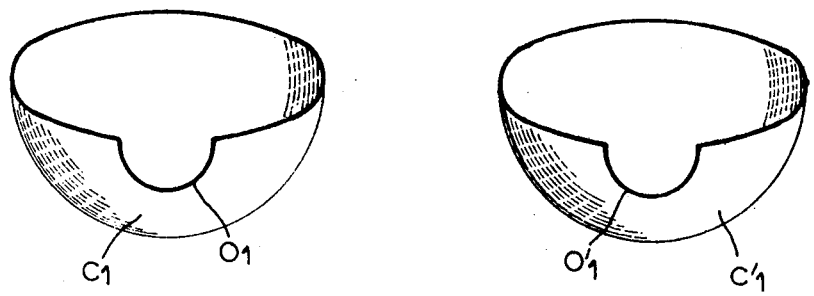
FIG. 1 is a perspective view showing a first pair of identical hemispheres each provided with a semi-circular recess, the hemispheres constituting the first or smallest container of one form of vessel.

The basic idea of the invention will now be explained, with reference to the construction of a spherical vessel, composed by two concentric spherical sheaths as shown on FIG. 8. If:

$d_1$=internal diameter of the internal sphere ($C_1$–$C'_1$),
$e_1$=wall thickness of said internal sphere,
$d_2$=internal diameter of the external sphere ($C_2$–$C'_2$),
$e_2$=wall thickness of said external sphere,
$e$=distance between the two spheres,
$p$=internal pressure of the internal sphere,
$x$=pressure within the space comprised between the two spheres, the stresses $\sigma_1$ and $\sigma_2$, exerted respectively upon the internal and the external spheres, are given by the following formulas:

$$\sigma_1 = \frac{(p-x)d_1}{4e_1}$$

$$\sigma_2 = \frac{xd_2}{4e_2}$$

By bringing in E, the "coefficient of Poisson," the increase in the diameter of the internal sphere $\sigma d_1$, under the action of the differential pressure to which it is subjected, is given by the formula:

$$\delta d_1 = d_1 \frac{\sigma 1}{E} = \frac{(p-x)d_1^2}{4Ee_1}$$

The increase in the diameter of the external sphere $\delta d_2$ is given by the formula:

$$\delta d_2 = d_2 \frac{\sigma 2}{E} = \frac{xd_2^2}{4Ee_2}$$

Following relation may besides be established:

$$d_2 = d_1 + 2(e_1 + e)$$

The thicknesses $e_1$ and $e_2$ being constant, and as the distance $e$ may be considered as constant, we have:

$$\delta d_2 = \delta d_1$$

and hence:

$$d_1 \sigma_1 = d_2 \sigma_2$$

As it may be admitted that:

$$d_1 \neq d_2$$

it results that:

$$\sigma_1 \neq \sigma_2$$

The internal pressure is consequently determined by the formula:

$$\frac{(p-x)d_1^2}{4Ee_1} = \frac{xd_2^2}{4Ee_2}$$

and hence:

$$x = p \frac{d_1^2 e_2}{d_2^2 e_1 + d_1^2 e_2}$$

If $x$ is known, the stresses $\sigma_1$ and $\sigma_2$ are easy to calculate.

This calculation supposes that the spheres are at the same temperature. It is possible to adapt the same method of calculation, by taking into account the influence of the temperature.

By calling:

$t_1$=temperature of the internal sphere,
$t_2$=temperature of the external sphere, we have:

$$\delta d_1 = d_1 \left( \frac{\sigma_1}{E} + \alpha_1 t_1 \right)$$

$$\delta d_2 = d_2 \left( \frac{\sigma_1}{E} + \alpha_2 t_2 \right)$$

where:

$\alpha_1$=expansion coefficient at the temperature $t_1$ of the material the internal sphere is made of,
$\alpha_2$=expansion coefficient of the temperature $t_2$ of the material the external sphere is made of.

If a resilient material is inserted between the two spheres, this material is subjected to a compression which is function of the pressure $x$. By calling $K$=compressibility factor of said material,
$\lambda$=actual compression of said material, we have:

$$\lambda = Kx$$

and hence:

$$\delta d_2 = \delta d_1 - 2Kx$$

The last equation allows to determine $x$. By supposing that the compression $\lambda$ of the material is related to the pressure by a parabolic function of the type:

$$\lambda = \alpha x_2 + \beta x$$

where $\alpha$ and $\beta$ are two component compressibility factors, we obtain then the equation:

$$\delta d_2 = \delta d_1 - 2\lambda$$

and hence the value of $x$.

This may be generalized by writing:

$$\lambda = a_0 x^n + a_1 x^{n-1} + \ldots + a_n$$

It will be readily seen that it is always possible to determine the number $n$ of the sheaths in such way, that the maximum thickness of these sheaths be smaller than a rated thickness for which the welding is easily performed.

It may also be seen that the thickness of the sheaths is indepedent of the internal pressure, which may be important, and of the diameter of the container, which may also be very important.

Although the calculations hereabove were made with reference to a vessel composed by two spherical sheaths, it will be appreciated that it is readily extended to a vessel composed by $n$ spherical sheaths or by a number $n$ of any sheaths of revolution.

Figure 2:
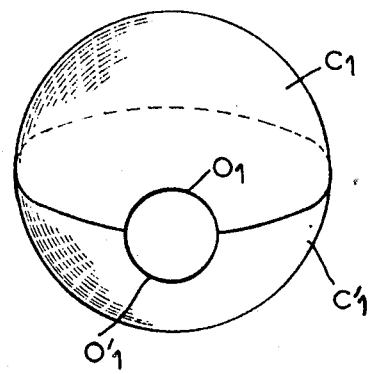
FIG. 2 is a perspective view showing the hemisphere of FIG. 1 positioned to form a first container.
Figure 3:
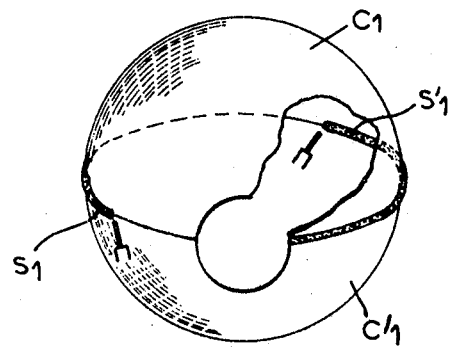
FIG. 3 is a perspective view identical to FIG. 2 and showing the manner in which the hemispheres are welded together to constitute the first container, the upper hemisphere being partly broken away so that the internal welding may be seen.

A vessel composed by $n$ spherical sheaths may be achieved as follows:

At the beginning, $n$ pairs of hemispheres such as the pair of hemispheres $C_1 C'_1$ on FIG. 1 and $C_2 C'_2$ on FIG. 4, are machined out, each of these hemispheres $C_1 C'_1$; $C_2 C'_2$ exhibiting a preferably semicircular recess $O_1$, $O'_1$; $O_2$, $O'_2$ respectively cut out on its free border, the circle corresponding to these recesses having a diameter sufficient to offer a passage to a man. The smallest hemisphere $C_1$ of one group is inverted over the smallest hemisphere $C'_1$ of the other group, their respective orifices recesses $O_1$, $O'_1$ being coincident so as to form a circular man-hole $O_1$–$O'_1$ (FIG. 2). These two hemispheres $C_1$ and $C'_1$ are then welded together along their biggest junction circle. The external weldings $S_1$ presents no difficulty. The internal welding $S'_1$ is easy to perform, as a man may penetrate within the container $C_1$–$C'_1$ (FIG. 3).

The next in size hemispheres $C_2$ and $C'_2$ of both groups are then juxtaposed and surround the smallest container $C_1$–$C'_1$, their respective orifices recesses $O_2$, $O'_2$ being coincident as previously (FIG. 5). The circular-man-hole $O_2$–$O'_2$ of the second container $C_2$–$C'_2$ is placed coincident with the man-hole $O_1$–$O'_1$ of the first container $C_1$–$C'_1$, in order to give passage to the welder. Again, the welding together of these two larger hemispheres $C_2$–$C'_2$ at $S_2$ (external welding) and $S'_2$ (internal welding) presents no difficulty. For the internal welding $S'_2$ it is sufficient to revolve the internal sphere $C_1$–$C'_1$ around an axis XX' perpendicular to the junction plane P of the two hemispheres to be welded together. The welder, who is within the innermost sphere $C_1$–$C'_1$, may accede, through the orifice circular man-hole $O_1$–$O'_1$ of this smallest sphere, to the junction line between the two outmost hemispheres $C_2$–$C'_2$ (FIG. 6).

Figure 7:
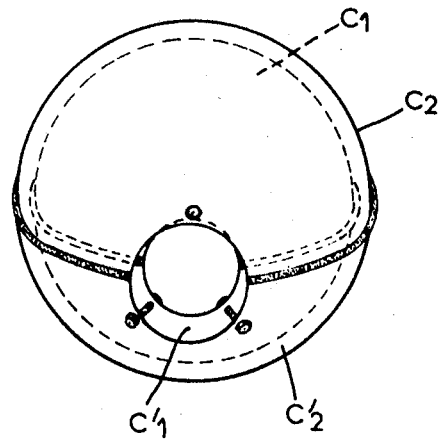
FIG. 7 is a perspective view showing the first and second containers rigidly secured with each other.

This process is repeated as many times as necessary, the just welded spheres being always rigidly secured to each other, and their man-holes being set to be coincident so as to give access to the junction line of the sphere to be welded next as shown on FIG. 7.

Figure 8:
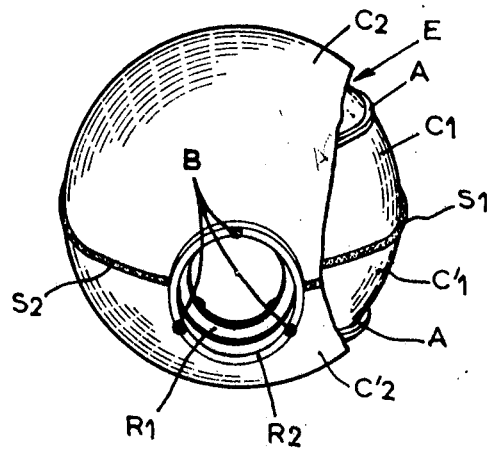
FIG. 8 is a perspective view of the completed vessel, with part of the second container broken away.

Advantageously, each man-hole $O_1$–$O'_1$ and $O_2$–$O'_2$ may be provided with a circular reinforcement $R_1$ and $R_2$ respectively (FIG. 8). By calling:

$\Omega$=sectional area of said reinforcement,
$\mu$=numerical coefficient,
$\rho$=radius of the circular orifice,
$e_n$=wall thickness of the sphere,
$\alpha$=the half-angle of the cone summit, this angle admitting the centre of the sphere as vertex and passing through the circular orifice, we have:

$$\Omega = \beta \rho e_n \alpha$$

This formula shows that the cross-section of the reinforcement is indepedent from the pressure.

As the values of $\rho$, $e_n$, and $\alpha$ are very close to each other the reinforcements in the different containers are practically identical.

These reinforcements $R_1$, $R_2$ may be joined together by bolts B or the like and provided with fluid-tight packings (not shown). In the case where the thickness of the reinforcements is smaller than the distance between two adjacent spheres, some circular rings, fastened by means of bolts, may be provided between said reinforcements.

The distance between two neighbouring spheres being constant, the securing into each other of the spheres, by means of resilient supports, may for instance be achieved, with the help of circular rings A located in parallel planes. These rings may be continuous or not.

The space E comprised between two neighbouring spheres may advantageously be filled with a liquid or a resilient material, for instance polystyrol or polyurethane, which is easy to compress.

The use of polystyrol or polyurethane, which are thermal insulators, allows to secure, besides the supporting rôle, a heat-protection rôle which is especially interesting in the case of a gas maintained for instance at very low temperature.

The vessels according to the invention may advantageously be utilized for the transportation or the storage of liquefied gas, especially of a gas presenting an important pressure at the air temperature, such as for instance methane.

It is obvious that the practically unlimited choice in the configurations which may be given to the vessels, allows to select, for each case, the most adapted form. Thus for instance, in order to resist to very high pressures, a spherical configuration will be selected if there are no space problems, while it will be preferable to adopt a cylindric configuration when the space requirements constitute an essential problem.

In the case of vessels with a generally cylindric configuration, it is possible to make profit of the advantages offered by a spherical form by providing spherical caps at both ends of these cylinders.

Of course, the invention is by no ways limited to the described methods of embodiment, which are given only by way of example.

What I claim is:

1. A method of making a vessel of revolution designed to contain any product exerting upon its wall a high pressure and having a wall thickness $e$ which is a function of said pressure and a function of the material of which the vessel is made and which exceeds the thickness value for which a complete penetration welding can be performed, said method including the steps of machining a set of $n$ pairs of homothetic shells having an axis of revolution and having a thickness $e/n$ sufficiently low to allow a complete penetration welding, both shells of a same pair being of identical dimensions and positionable along a common junction line located substantially in a plane perpendicular to said axis of revolution, providing said both shells with a cut-away portion forming a recess upon said junction line and having sufficient dimensions to give passage to a man, positioning the two smallest shells of the aforesaid set along said junction line, the two aforesaid recesses being opposite, so as to form a first container having an axis of revolution and provided with a first man-hole, welding said smallest shells along said junction line both internally and externally in effecting a complete penetration welding, covering said first container with the two next larger-in-size shells of said set, their axes of revolution being placed coincident with the axis of revolution of said first container, positioning said next larger-in-size shells along their junction line their two recesses being opposite, so as to constitute a second container surrounding said first container and provided with a second man-hole, placing said second man-hole in coincidence with said first man-hole to give a passage to a man, welding said next larger-in-size shells along their junction line both externally and internally in effecting a complete penetration welding and by revolving said first container relative to said second container, about its axis of revolution, rigidly securing said first and second containers to each other, with said first and second man-holes in coincidence and repeating the aforesaid steps for subsequent containers.

2. A method as claimed in claim 1 further including the step of introducing a filling substance between two neighboring containers whereby transmission of an internal pressure from one container to the next is allowed and whereby a support for the internal container is provided.

References Cited

UNITED STATES PATENTS 2,113,060   4/1938   Sandberg _____ 113—120 XR
2,363,990   11/1944  Priebe.

JOHN F. CAMPBELL, Primary Examiner

R. B. LAZARUS, Assistant Examiner

U.S. Cl. X.R.

29—471.1; 220—3, 5

PO-1050
(5/69)

UNITED STATES PATENT OFFICE
CERTIFICATE OF CORRECTION

Patent No. 3,514,839      Dated June 2, 1970

Inventor(s) Edouard, Georges, Daniel Rodrigues

It is certified that error appears in the above-identified patent and that said Letters Patent are hereby corrected as shown below:

Column 1, line 4, after "assignor" insert: ---of an undivided one-half of the entire right, title and interest---

Column 1, line 26, correct the spelling of "present"

Column 1, line 72, after "portions" insert: ---of revolutions---

Column 2, line 11, the period should be a comma.

Column 4, line 43, correct the spelling of "independent"

Column 4, line 62 and 70 cancel "orifice"

Column 5, line 6, cancel "orifice".

SIGNED AND
SEALED
DEC 8 -1970

(SEAL)
Attest:

Edward M. Fletcher, Jr.
Attesting Officer

WILLIAM E. SCHUYLER, JR.
Commissioner of Patents